United States Patent

[11] 3,620,214

| [72] | Inventor | Thomas Thackston<br>Florham Park, N.J. |
|---|---|---|
| [21] | Appl. No. | 840,405 |
| [22] | Filed | July 9, 1969 |
| [45] | Patented | Nov. 16, 1971 |
| [73] | Assignee | C. R. Bard, Inc.<br>Murray Hill, N.J. |

[54] MOLDED SURGICAL MASK
5 Claims, 3 Drawing Figs.

[52] U.S. Cl. .................................................. 128/146.2,
161/156
[51] Int. Cl. .................................................. A62b 23/02
[50] Field of Search .................................................. 128/146.2,
146, 141, 141 A, 205, 146.6; 161/156, 152, 203, 204

[56] References Cited
UNITED STATES PATENTS

| 3,316,904 | 5/1967 | Wall et al. .................... | 128/146.6 |
| 2,552,124 | 5/1951 | Tallman ....................... | 161/156 X |
| 3,333,585 | 8/1967 | Barghini et al. ............... | 128/212 |

FOREIGN PATENTS

| 548,150 | 10/1957 | Canada ....................... | 161/156 |

Primary Examiner—Richard A. Gaudet
Assistant Examiner—G. F. Dunne
Attorney—W. Saxton Seward ABSTRACT: A molded surgical cup mask of three-ply construction, the first and third plies being of polyester batting acrylic emulsion bonded to form a durable film, the intermediate ply being unbonded microglass and the plies being molded into a unit by heat and pressure.

PATENTED NOV 16 1971

3,620,214

INVENTOR.
THOMAS THACKSTON
BY
*Nolte and Nolte*
ATTORNEYS

MOLDED SURGICAL MASK

While both polyester materials and glass fibers have been used in surgical masks, the particular combination disclosed herein constitutes a sufficiently rigid, shapely, highly efficient mask with excellent breathability, as well as being washable and readily sterilized.

A practical embodiment of the invention is shown in the accompanying drawing, wherein.

Figure 1:
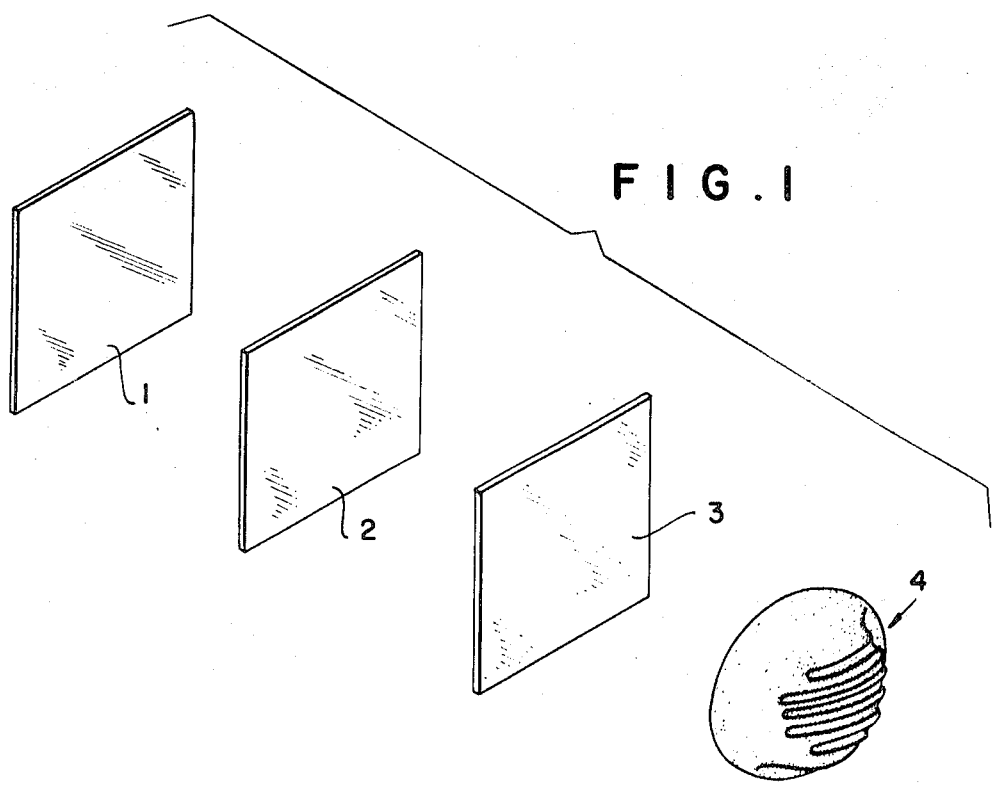
FIG. 1 represents a flow diagram, in perspective, of the method of forming the mask.

Referring to the drawings, the components of the mask are shown as including a layer of polyester batting 1, a layer of filtering material 2 and a second layer of polyester batting 3, similar to the layer 1. The polyester batting may suitably be bonded by the addition of an acrylic binder such as "Rhoplex B-15" (Rohm and Haas) which has good mechanical, chemical and dimensional stability, water resistance and flexibility. The filter material 2 is preferably unbonded microglass, which may, for example, have a fiber diameter of 0.75 to 1.5 microns, the layer having a thickness of 0.004 to 0.005 inch and net weight, in grams per square foot, of 1 ½ to 3 ½.

Figure 2:
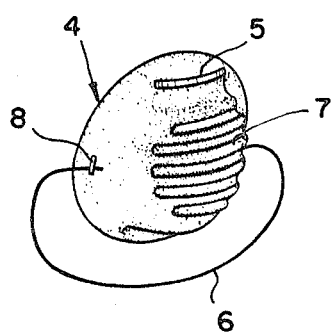
FIG. 2 represents a perspective view of the completed mask.
Figure 3:
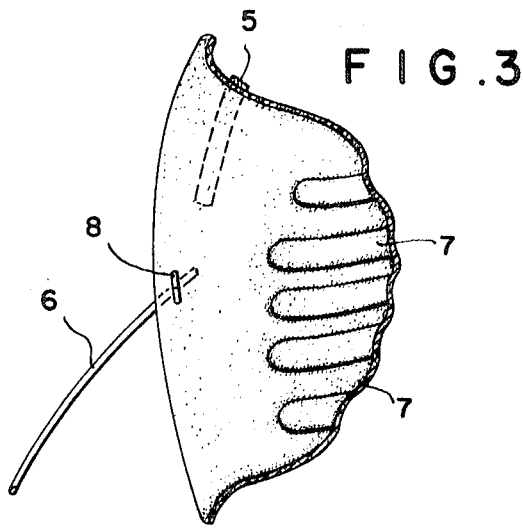
FIG. 3 represents a vertical medial section through the mask.

The layers 1, 2 and 3 are brought together in a cup-shaped mold and subjected to heat (e.g. 325° F.) and pressure sufficient to cause impregnation of the layer 2 by the acrylic emulsion of the layers 1 and 3, with a cycle of 3 to 10 seconds depending on thickness and required rigidity, thus forming a shaped unit 4, as shown in FIG. 2.

A bendable metal nose strip 5 is adhesively attached and an elastic headband 6 is connected at its end to each side of the mask.

It is desirable to mold into the central part of the mask several horizontally disposed undulations or corrugations 7 which not only increase somewhat the effective area in relation to the outside dimensions but also help the mask to retain its form.

The elastic headband 6 has its ends attached to suitable points 8 at each side of the mask, spaced from the edge thereof, for holding the entire edge of the mask firmly against the wearer's face.

What is claimed is:

1. A surgical mask comprising a body having a cupped shape and being formed of inner and outer layers of polyester batting stabilized by acrylic emulsion and an intermediate filtering layer of inherently unstabilized fine-spun microglass composed substantially of fibers having a diameter of 0.75 to 1.5 microns bonded to said inner and outer layers to constitute a self-supporting dimensionally stable unit.

2. A mask according to claim 1 wherein the material of the intermediate layer is initially unbonded.

3. A mask according to claim 1 provided with horizontally disposed corrugations.

4. A mask according to claim 2 wherein the intermediate layer is impregnated by the acrylic emulsion.

5. A mask according to claim 1 wherein the microglass is in the form of a layer having a thickness of 0.004 inch to 0.005 inch and net weight of 1½ to 3½ grams per square foot.

* * * * *